(12) United States Patent
Scott et al.

(10) Patent No.: US 12,085,145 B2
(45) Date of Patent: Sep. 10, 2024

(54) UNIVERSAL TIE-DOWN APPARATUS AND METHOD OF USE

(71) Applicants: Daniel Scott, Marietta, GA (US); James Caudle, Kennesaw, GA (US)

(72) Inventors: Daniel Scott, Marietta, GA (US); James Caudle, Kennesaw, GA (US)

( * ) Notice: Subject to any disclaimer, the term of this patent is extended or adjusted under 35 U.S.C. 154(b) by 125 days.

(21) Appl. No.: 17/842,887

(22) Filed: Jun. 17, 2022

(65) Prior Publication Data
US 2022/0403916 A1    Dec. 22, 2022

Related U.S. Application Data

(60) Provisional application No. 63/212,031, filed on Jun. 17, 2021.

(51) Int. Cl.
    *F16G 11/10*      (2006.01)

(52) U.S. Cl.
    CPC .......... *F16G 11/106* (2013.01); *Y10T 24/3944* (2015.01)

(58) Field of Classification Search
    CPC .. F16G 11/106; F16G 11/101; Y10T 24/3944; Y10T 24/394
See application file for complete search history.

(56) References Cited

U.S. PATENT DOCUMENTS

| | | | | |
|---|---|---|---|---|
| 1,139,595 A | * | 5/1915 | Starr | G09F 3/0323 403/368 |
| 1,187,109 A | * | 6/1916 | Steuernagel | B25B 5/166 269/204 |
| 1,243,105 A | * | 10/1917 | Richardson | F16G 11/10 24/134 R |
| 2,387,436 A | * | 10/1945 | Frank | H01R 4/52 24/134 P |
| 6,070,305 A | * | 6/2000 | Reynolds | F16G 11/106 24/132 R |
| 6,793,046 B2 | * | 9/2004 | Petzl | A62B 1/14 188/65.1 |

(Continued)

*Primary Examiner* — Robert Sandy
*Assistant Examiner* — Louis A Mercado
(74) *Attorney, Agent, or Firm* — Richard C. Piercy, Esq.; Grell & Watson Patent Attorneys LLC

(57) ABSTRACT

An apparatus for securely joining ropes for rope suspension or payload tie down. The apparatus includes a two substantially identical channel assemblies configured having a first bend to form a rope groove on one end and a second bend to form a cam channel on the other end, the cam channel having a rivet hole and a pin therethrough to enable a cam to rotate therein, and an attachment mechanism to secure the channel assemblies back-to-back thereto. By opening the cam of either assembly, a rope may be threaded through the rope grove, then again on the opposite assembly. The rope can be pulled from its end away from the assemblies to tighten prior to closing the cam(s) upon the ropes. The rope can further be secured by continuing to pull after the cam has been closed, or by using an optional tightening mechanism and method. A method of tying down cargo or rope suspension using the apparatus of the disclosure for uses such as general-purpose camping, hiking, and other general-purpose tie-down and/or suspension uses of ropes. A method of tightening one or more ropes using the tie-down apparatus disclosed.

15 Claims, 5 Drawing Sheets

(56) References Cited

U.S. PATENT DOCUMENTS

| | | | | |
|---|---|---|---|---|
| 7,137,481 B2 * | 11/2006 | Petzl | ....................... | A62B 1/10 |
| | | | | 188/65.1 |
| 8,578,566 B2 * | 11/2013 | Jolly | ..................... | F16G 11/14 |
| | | | | 292/307 R |
| 8,967,918 B2 * | 3/2015 | Schneider | ................. | E02D 5/80 |
| | | | | 405/259.1 |
| 9,192,792 B2 * | 11/2015 | Moine | .................... | A63B 29/02 |
| 9,453,555 B2 * | 9/2016 | Dingley | ............... | F16G 11/108 |
| 9,498,660 B2 * | 11/2016 | Moine | ...................... | A62B 1/14 |
| 10,801,581 B2 * | 10/2020 | Ranum | ................ | F16G 11/106 |
| 10,859,134 B2 * | 12/2020 | Oldiges | ................ | F16G 11/106 |
| 2003/0115723 A1 * | 6/2003 | Shuey | .................. | F16G 11/106 |
| | | | | 24/136 R |
| 2004/0048522 A1 * | 3/2004 | Facey | ................ | F16G 11/106 |
| | | | | 439/783 |

* cited by examiner

UNIVERSAL TIE-DOWN APPARATUS AND METHOD OF USE

CROSS-REFERENCE TO RELATED APPLICATIONS

To the full extent permitted by law, the present U.S. Non-Provisional patent application hereby claims priority to and the full benefit of, U.S. Provisional Application entitled "UNIVERSAL TIE-DOWN APPARATUS AND METHODS OF USE" having assigned Ser. No. 63/212,031, filed on Jun. 17, 2021, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

FIELD OF THE DISCLOSURE

The present disclosure relates to a device for the joining and tensioning of two lines proximate their ends. Specifically, the present disclosure relates to a universal tie-down device capable of joining two ropes of specified diameter such that they may be tightened and secured to a plurality of anchoring points.

BACKGROUND

The present disclosure relates to a simple and inexpensive apparatus for enabling the tie down of one or more ropes along any point on the rope, such that they may be quickly and easily attached, tensioned, and reliably fixed in place under tension, while also enabling the rope or line to be quickly and easily released and/or detached. In potentially preferred embodiments of the disclosed device, it is compact, portable, sturdy, and capable of securing capacities using rope or line which exceed that of similar devices currently available to consumers. Such a device of the disclosure may offer the ability to secure two ends of any rope or line of specified diameter, such that a weight may be suspended between two fixed points or such that a payload may be secured to a conveyance for secure, reliable transport. Using accessories and/or attachments, ropes may be increasingly tightened beyond that which ordinary pulling upon the rope and/or device may achieve on its own. Additionally, these accessories may be used to relieve pressure upon the system formed between the apparatus of the disclosure and the ropes in their tightened form, in order to detach the apparatus of the disclosure from the ropes under extreme pressure and/or friction.

A variety of devices for tie-down tensioning lines, ropes, straps, the like and/or combinations thereof may exist for use in various circumstances. However, these devices may often be subject to one or more disadvantages in use. For example, some devices may create difficulty in adjusting overall line length prior to tensioning, which may create the necessity to use multiple tensioning devices or adjust the tensioning devices in an inconvenient or inopportune manner. This is especially true for those devices incorporating complex and/or inconvenient ratcheting or cam mechanisms (e.g., ratcheting straps) or those having one fixed-length end. In the case of ratcheting straps, these usually provide tension at a fixed point in a line or rope or strap, which can be only adjusted toward that fixed point in one direction. This point on a line may not be ideal in various circumstances and therefore may not offer ideal placement to secure a load or suspend a weight. The point at which the ratcheting strap is fixed may be obstructed and therefore become impossible to use with certain anchoring points, hooks, payloads, objects, the like and/or combinations thereof. Other devices incorporate sheaves, pins, springs, ratchets, cams, and other small parts that can wear out, potentially fail suddenly and without warning, and not work properly in harsh, muddy, wet, and extremely cold environments. As may be the case with certain ratcheting straps, tensioning may be finite and only adjustable within a specified range or capacity (i.e., length of line). Alternatively, they may only offer the ability to place specified types of straps or lines within the mechanism, thereby limiting the potential strength, line width, length, or material to those specific to the specific mechanism or apparatus. Additionally, usually multiple straps or lines may be required, each requiring its own anchoring point and corresponding anchor (e.g., hook placed into loop for anchoring). By looping a line or rope through one anchoring point, it can serve as its own anchor and be fashioned such that a single line or rope may be looped through multiple anchoring points and a tensioning device of the disclosure, creating additional strength, weight displacement, and versatility for use in securing loads or suspending weight using the rope or line.

Ratcheting straps are popular, commonly known and used devices which can be used to secure a wide variety of objects to various support surfaces and/or to various other objects. Typically, such straps are used to keep an object from falling or moving relative to a vehicle during transport. Such ratcheting straps typically have two portions; a long strap/hook, and a ratcheting strap sub-assembly including a short strap hook. Each strap/hook has a hook at one end which attaches to say an immovable anchor feature in or on the vehicle. The long strap/hook has a long webbing with its hook at one end. The short strap/hook has a short webbing with its hook at one end and a ratcheting mechanism at the other end. The non-hook end of the free strap sub-assembly's long webbing is fed into the ratcheting sub-assembly and adjusted to near its intended final length, then the hooks are secured to the vehicle and the long webbing is wrapped loosely around the object and the ratcheting mechanism is activated to reel in the slack of the long webbing and tightly secure the object to the vehicle. However, in use, ratcheting straps may require a user to tolerate various drawbacks, as noted above, such as a fixed-length at one end, which may diminish areas which these may be used to tie down or suspend objects using straps. Despite these shortfalls, ratcheting straps offer the enormous benefit of high load limits, often exceeding thousands of pounds in strength, so their popularity among those needing to tie-down or suspend from straps remains.

Another, which is perhaps the most long-known and well-known means to secure rope in tie-down and/or suspension tasks known in the art, may be knots. Knots usually require at least one end of a rope be available to wrap and tie around another portion of the rope. Ends may be tied proximate each other as well to loop the rope. However, knots rely on at least (i) the length of rope being suitable for tying (i.e., the knot consumes length of rope) and (ii) the frictional force achieved by the knot itself, which is usually limited by the type of rope or line being used. Additionally, it may be difficult to relieve a knot under enormous pressure without cutting or otherwise severing the rope. This may be especially true if the rope must be removed quickly.

A variety of other devices and methods for tie-down tensioning lines, ropes, straps, the like and/or combinations thereof may exist for use in various circumstances. However, these devices are subject to one or more similar disadvantages in use, the improvement of which may increase the overall adoption of such devices and their use in tying down or suspension using rope.

Therefore, there exists a long-felt and unresolved need for a device which provides the universal ability to join one or more ropes, like that of a knot, at any point on the one or more ropes, while also providing a point by which tightening of the system formed between the device and the rope can be achieved, like that of a ratcheting strap, to solve the issues related to the secure tie-down of payloads and suspension of weight detailed herein.

SUMMARY

The present disclosure may solve the aforementioned limitations of the currently available rope suspension and secure tie-down devices, systems and methods by providing a universal tie-down apparatus and method of use.

Accordingly, in one aspect, the present disclosure embraces the simplicity achieved through the tying of knots using rope. In a sense, anywhere a knot can be formed, the device of the disclosure may be placed and the ropes tightened to form a system of tying down and/or suspension. By providing a universal tie-down apparatus, any ordinary rope within the diameter specifications of the particular apparatus (which may be adjusted to accommodate various rope diameters) can be made into what amounts to a high-strength knot, which can be easily released when desired. Since maximum universality, maximum strength, minimum cost, and other factors may be adjusted to properly balance tradeoffs and benefits for various circumstances, adjustments to the device of the disclosure may address these concerns to provide the most suitable device for certain various specific uses of the device of the disclosure.

As noted above, the simplest solution to many of the issues with existing devices outlined above may be the fashioning of knots for securing rope or lines to payloads or for the suspension of weight. Knots are extremely versatile and offer efficient and predictable strength for such uses. Knots can be tied in infinite ways and nearly anywhere at least some distance from an end. Additionally, the number of knots used may increase or duplicate the strength provided, even with crude knot tying techniques. As the saying goes, if you can't tie knots, tie lots. However, knots, whether expertly or crudely tied, will consume rope length. Additionally, knots may be limited in that certain rope, lines, the like and/or combinations thereof may not offer sufficient strength using only the tying force and static friction along the rope length. Furthermore, most rope require that knots be made at least some distance from an end. However, the principles of knot tying may be adapted within a device or apparatus, such as that of disclosure, in order to enable for the secure and efficient tying within the apparatus of the disclosure, thereby achieving the strength and adaptability often desired when joining rope or lines to secure payloads or suspend weight using said rope or line. This offers the added benefit of not consuming rope length to achieve the secure "knot" as well as not requiring that a "knot" be placed some distance from an end, but can be placed at the literal end-of-the-rope. The instant disclosure may be designed to address at least certain other aspects of the problems or needs discussed above by providing such an apparatus specialized for the purpose of joining two lines or ropes at any point for securing a payload, suspending a weight, or other uses known to those having ordinary skill in the art. Such an apparatus may be capable of offering a load capacity which may exceed 600 pounds and a pull test rated to withstand capacities of up to and exceeding 2,000 pounds. The apparatus body may comprise, in a potentially preferred embodiment, 201 stainless steel in order to achieve the high strength, durability, lightweight, and high corrosion resistance properties known to those skilled in the art. Having such properties, the disclosed universal tie-down apparatus may be manufactured in such a size capable of fitting in the palm of a user's hand, with dimensions, in a potentially preferred embodiment of 4.75 inches by 3 inches by 1.5 inches. In preparation for use, cams of the disclosed apparatus swing open and the latches hold them open until the user is ready to lock down the rope or line. In this state, a rope can easily be placed in the device. In another preferred embodiment of the disclosure, cut outs in the body of the disclosed apparatus can allow for additional tie down options such as the attachment of bungies or carabiners to attach additional accessories and create a webbing effect, most useful for tie-down or payload security uses. Having an end, which is not fixed at a certain specified length, the user may choose or identify an ideal location and be afforded wide latitude for adjustment along the length of line or rope being secured.

Essentially, in one aspect, the device and apparatus of the disclosure may feature a pair of identical assemblies. Each assembly may comprise a (i) a housing having (a) a first bend to form a rope groove and (b) a second bend to form a cam channel opposite the first bend (the cam channel having a rivet hole, (ii) a spring-loaded pin therethrough the rivet hole of the cam channel and (iii) a am rotatably installed thereon the spring-loaded pin. These two, perhaps substantially identical assemblies may be secured to one another back-to-back (or side-by-side) in opposite or opposing directions in order to form the universal tie-down assembly of the disclosure. Those having ordinary skill in the art may understand that two identical sub-assemblies being securely joined back-to-back may enable oppositional force abilities, enabling rope to pass through each rope groove, and the cam assemblies restrict movement in opposing directions, allowing it in the opposite, to enable securing rope through each rope groove in opposite directions using, perhaps preferentially, high-frictional surfaces on the area of the cam in contact with the rope. Additional mechanisms, such as the spring-loaded pin, may enable the pinching or biting force necessary to increase this frictional force's magnitude upon the rope within the rope groove during use. While the high-frictional surface may be present on various areas of the cam, the rope groove, or other areas of the disclosed assembly, it may be critical to be provided at that area which is in contact with the rope during use. Additionally, as those skilled in the art may understand, various means exist to achieve friction in one direction, but not another. These means, as explored in detail below, may include teeth pointed toward the rope end and in the direction of tensional force.

In one aspect, in a potentially preferred embodiment of the apparatus of the disclosure, additional areas may exist for accessories to be used in connection with the device of the disclosure. Specifically, these accessories may be simple and/or complex machines in order to increase the tension across the device of the disclosure by moving the rope beyond the area which may be achieved through ordinary human pulling force. In a simplest embodiment of an accessory of the disclosure, a loop may be manufactured extending from each housing pair, the loop capable of receiving at the rope-end side of the rope groove. The loop may be capable of receiving a simple eye-bolt perpendicularly to the rope groove. The rope may be threaded through the eye of the eye-bolt and another bolt, lever, rod, etc. may also be placed through the eye in order to enable the eye-bolt to be spun and the rope tightened through the apparatus of the disclosure. Other, more complicated means of increasingly pulling the rope beyond the strength of a human force, may exist and be described in various detail throughout the disclosure and related art known to those of ordinary skill. These may include wenches, pulleys, wheels, cranks, gears, winds, livestock, the like and/or combinations thereof.

In another aspect, in a potentially preferred embodiment of the apparatus, various dimensional benefits may be achieved for a plurality of use cases, depending on the rope and circumstances of use. For instance, since rope is usually cylindrical in shape, the cam may be grooved to surround a cylinder, such that various rope diameters may be accommodated, such as ropes from ¼ to ¾ in. diameter. Cam to rope contact may be increased by using cams of various dimensions, to increase the total frictional force providing tension in the overall system. Other features, such as levers, may be included to provide various benefits, such as locking the cams in the open position or increasing the ability to relieve force upon the rope during high-tension use cases. Finally, a plurality of apertures may be included for numerous uses and benefits, including but not limited to (a) carabiner attachment, (b) lowering weight, (c) decreasing manufacturing costs, (d) accessory attachment, (e) anchor attachment, (f) webbing/bungie attachment, (g) the like, and/or (h) combinations thereof.

In an exemplary embodiment of the method of use of the universal tie-down apparatus, the apparatus and one rope. The rope may be laid across an area capable of receiving a payload, the rope of sufficient length to wrap at least one time around the intended payload. The intended payload may be deposited upon the rope and surrounding area. The free ends of the rope may be joined (i.e., placed around the payload and beside or proximate one another) once the payload has been deposited. The device of the disclosure may then be placed proximate these ends, and the cams opened to expose the rope groove. The rope ends may be placed into the rope grooves on each side, each ends in the direction opposite the cam's optimal frictional force. The ends may then be pulled, either simultaneously or one-at-a-time until the payload is confidently secured. The same process may be achieved using more than one rope by first securing or anchoring each rope at one end or multiple devices may be used to implement a multi-rope loop. Other various configurations and methods may be achieved using the device of the disclosure, as will be understood by those having skill in the art. Suspension may be achieved by looping or anchoring the rope around a first vertical support, a second vertical support, and similarly meeting or joining the ropes with the device of the disclosure.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-5, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available devices and methods of securely joining ropes by providing an apparatus capable of securely joining a first rope to a second rope through the apparatus. Once joined in a convenient location, each end of each rope may be pulled through in order to secure the apparatus to the rope. In the closed position, the cams of the universal tie down apparatus "bite" upon the rope under incredible force and only allow movement in a single direction. As movement in the other direction being prevented, the rope may be secured to a structure, such as a tree or building, or a conveyance for transport. As may be appreciated by one skilled in the art, the universal tie-down apparatus may be thought of as a type of "Chinese finger trap", which only allows outward movement from the device once a grasping or other frictional pressure is relieved.

Figure 1:
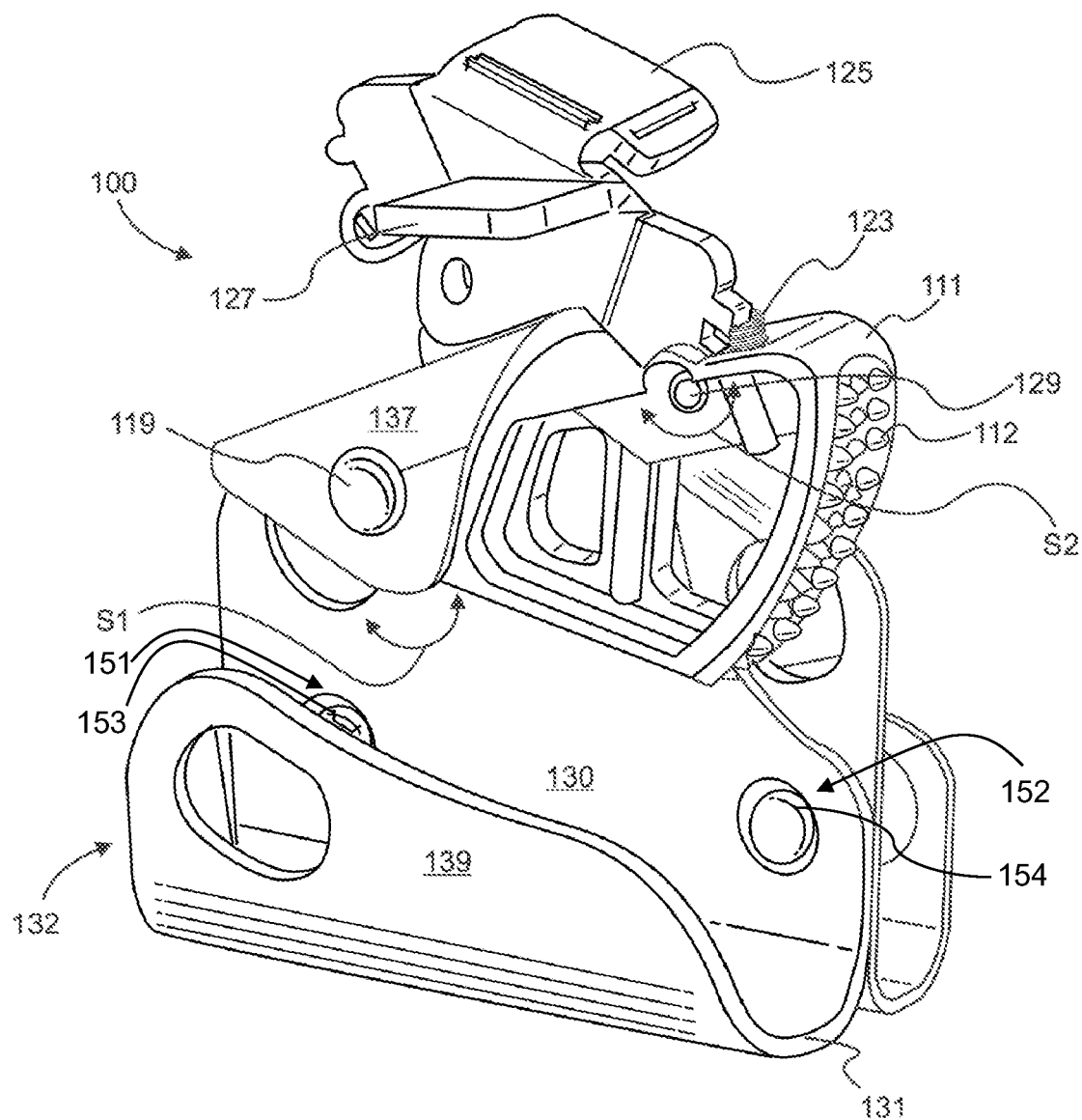
FIG. 1 is a perspective view of an exemplary embodiment of the universal tie-down apparatus, the apparatus in the open position ready to receive a rope.

Referring now to FIG. 1 specifically, therein illustrated is a perspective view of an exemplary embodiment of universal tie-down apparatus 100, universal tie-down apparatus 100 in the open position ready to receive a rope. Universal tie-down apparatus 100, or simply apparatus 100, is illustrated as having channel assembly, or channel portion 130. Chanel portion 130 may include or may be configured having rope receiving bend 139, having rope entrance 132 and rope exit 131, which is opposite cam-pin bend at cam channel 137. In combination, channel portion 130 may be thought of as an entire channel assembly having rope receiving bend 139 and cam channel 137, along with their various sub-components and areas of interest as herein illustrated and described. Hence, it may be formed as a unified single part, or as multiple sub-parts and components thereof. Cam 111 may include or may be configured having a connection to channel portion 130 via cam spring pin 119. Cam 111 further comprises a frictional component, such as teeth 112 which extend into rope receiving bend 139 when apparatus 100 is in the closed or securing position to removably lock rope R therein. Lever 127 operably engages biasing element 123 (illustrated therein as a spring) to open and close cam 111 upon a rope during use. As illustrated herein FIG. 1, lever 125, 127 may have formed thereon a perpendicular ridge in order to provide grip and facilitate force provided in the direction opposite of spring-loaded pin 119. As shown, apparatus 100 features substantially identical components on the side opposite of what is illustrated and may be connected using an attachment means and/or mechanism (e.g., pins through a hole) or, as illustrated via first pin 153 through first hole 151 (and second hole 152 on opposite channel) and second pin 154 through second hole 152 (and first hole 151 on opposite channel) to form a sturdy connection between identical cam assemblies in a non-chiral back-to-back, opposing arrangement such that rope may be fed through opposing sides and tension upon rope is generated in opposing directions when fully engaged. Swing force S1 is achieved using cam spring pin 119 in order to open and close cam 111 of apparatus 100 and swing force S2 may be achieved using levers 127, 125 about lever pin 129 to relieve downward tension for disengagement of apparatus 100. As may be understood by those having skill in the art, channel portion 130 may feature an at least one aperture or several apertures, or simply holes thereon. These may offer the triple-benefit of lowering the overall weight of apparatus 100, lowering the cost to manufacture apparatus 100, and the ability to attach accessories, such as e.g., carabiners, netting, or other tie-down apparatuses, such as ratcheting straps or hooks.

Figure 2:
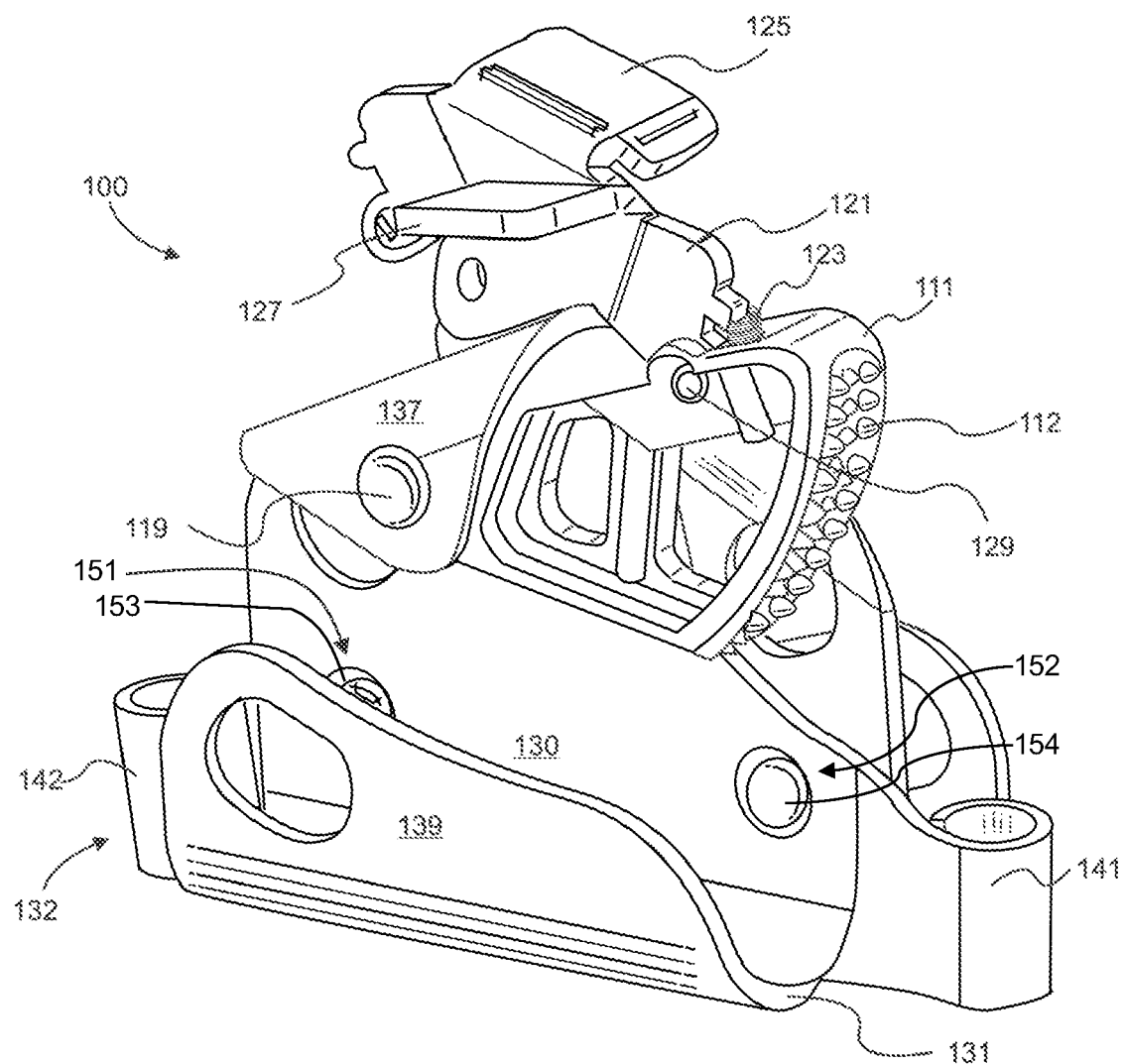
FIG. 2 is a perspective view of an alternate embodiment of the universal tie-down apparatus, the apparatus in the open position ready to receive a rope.

Referring now to FIG. 2 specifically, therein illustrated is a perspective view of an alternate embodiment of universal tie-down apparatus 100, universal tie-down apparatus 100 in the open position ready to receive a rope. The alternate embodiment illustrated therein FIG. 2 may include all features of exemplary embodiment of universal tie-down apparatus 100. Those include channel portion 130 having rope receiving bend 139 opposite cam channel 137, cam 111 attached thereto using cam spring pin 119, cam 111 having teeth 112, lever 125, lever 127, and biasing element 123. Apparatus 100 may feature substantially identical components on the side opposite of what is illustrated which may be connected using via first pin 153 through first hole 151 (and second hole 152 on opposite channel) and second pin 154 through second hole 152 (and first hole 151 on opposite channel) to form a sturdy connection between identical cam assemblies in a non-chiral back-to-back, opposing arrangement such that rope may be fed through opposing sides and tension upon rope is generated in opposing directions when fully engaged. The alternate embodiment of apparatus 100 further includes first eye-bolt receiving loop 141 and second eye bolt receiving loop 142. First eye-bolt receiving loop 141 and second eye-bolt receiving loop 142 may each receive an eye-bolt for the further tightening and securing of a rope using the universal tie-down apparatus 100. By first threading the rope through rope receiving bend 139 and the second rope receiving bend opposite rope receiving bend 139 (not pictured) and securing cam 111 upon the rope using, e.g., teeth 112, to hold the rope in place proximate a rope into the aperture formed atop said eye-bolt after first threading said rope through rope receiving bend 139 and closing cam 111 upon the rope. The eye-bolt may be passed upwardly (with the eye atop the loop) or downwardly (with the eye beneath the loop according to the viewer perspective) through either (or both) of first eye-bolt receiving loop 141 and second eye-bolt receiving loop. The rope may be then threaded through the eye, and the bolt may be spun to increase tension upon the system formed using apparatus 100 and rope end R1 and rope end R2. Additional mechanisms, such as another eye-bolt, a rod, a crank, a drill attachment, the like and/or combinations thereof, may be additionally threaded through the eye of the eye-bolt, thereby increasing the force possible to spin the bolt. Such a mechanism may be critical to relieving tension upon a system of the disclosure, especially in cases where a payload has expanded during transit/storage, or when initial tension was similarly highly-secured. By pulling the rope, tension through the device is relieved, which may relieve the pinching pressure upon ropes R1, R2 and enable the cams to be opened and the rope R1, R2 may be easily removed.

Figure 3:
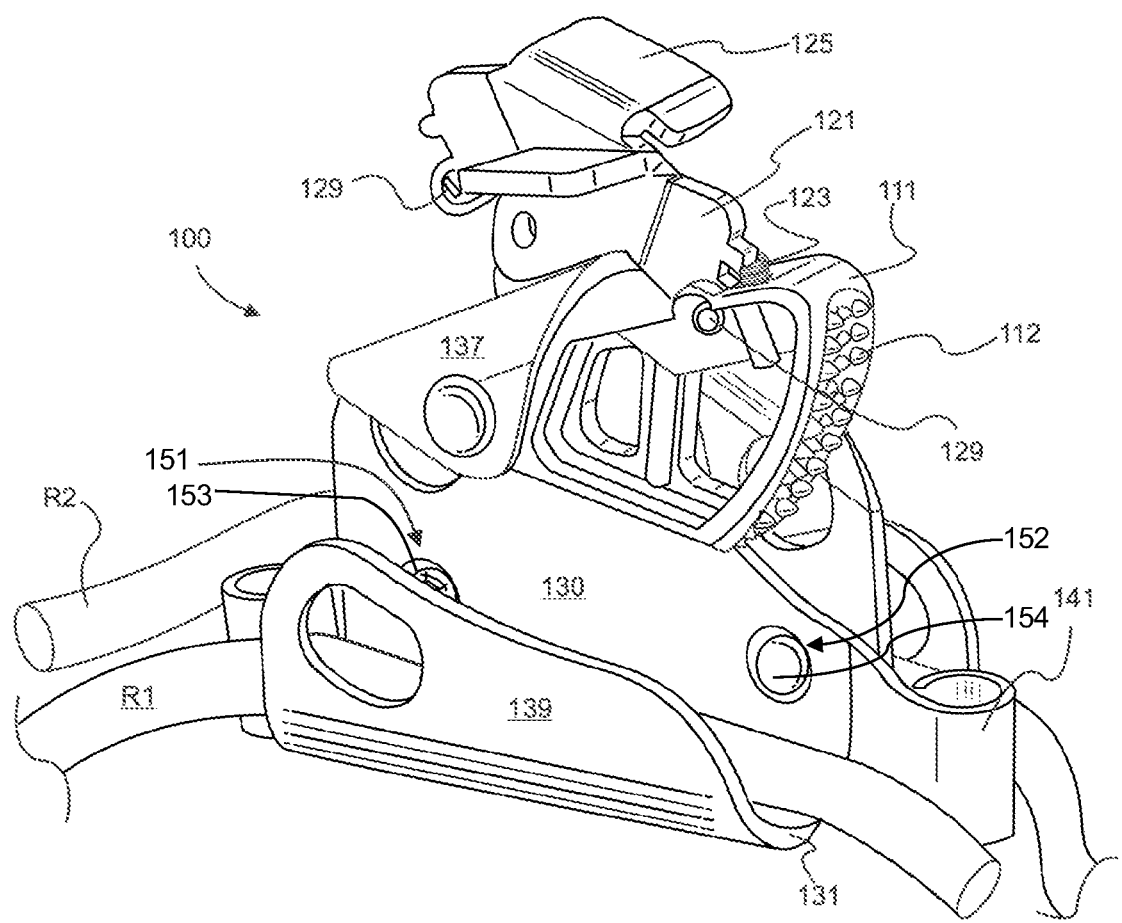
FIG. 3 is another perspective view of the alternate embodiment of the universal tie-down apparatus, the apparatus in the open position and having a rope installed in each position thereon.

Referring now to FIG. 3 specifically, therein illustrated is another perspective view of the alternate embodiment of universal tie-down apparatus 100, universal tie-down apparatus 100 in the open position and having first rope end R1 and second rope end R2 installed in each corresponding position thereon. As was the case with the alternate embodiment illustrated in FIG. 2, the same embodiment illustrated in FIG. 3 may include all features of exemplary embodiment of universal tie-down apparatus 100, plus additional features not illustrated therein FIG. 1. Those include channel portion 130 having rope receiving bend 139 opposite cam channel 137, cam 111 attached thereto using cam spring pin 119, cam 111 having teeth 112, lever 125, lever 127, and biasing element 123. Additionally, Apparatus 100 may feature substantially identical components on the side opposite of what is illustrated which may be connected using via first pin 153 through first hole 151 (and second hole 152 on opposite channel) and second pin 154 through second hole 152 (and first hole 151 on opposite channel) to form a sturdy connection between identical cam assemblies in a non-chiral back-to-back, opposing arrangement such that rope may be fed through opposing sides and tension upon rope is generated in opposing directions when fully engaged. The alternate embodiment of apparatus 100 further includes first eye-bolt receiving loop 141 and second eye bolt receiving loop 142. First eye-bolt receiving loop 141 and second eye-bolt receiving loop 142 may each receive an eye-bolt for the further tightening and securing of a rope using the universal tie-down apparatus 100. By first threading the rope through rope receiving bend 139 and the second rope receiving bend opposite rope receiving bend 139 (not pictured) and securing cam 111 upon the rope using, e.g., teeth 112, to hold the rope in place proximate a rope into the aperture formed atop said eye-bolt after first threading said rope through rope receiving bend 139 and closing cam 111 upon the rope. The eye-bolt may be passed upwardly (with the eye atop the loop) through either (or both) of first eye-bolt receiving loop 141 and second eye-bolt receiving loop. The rope may be then threaded through the eye, and the bolt may be spun to increase tension upon the system formed using apparatus 100 and rope end R1 and rope end R2. Additional mechanisms, such as another eye-bolt, a rod, a crank, a drill attachment, the like and/or combinations thereof, may be additionally threaded through the eye of the eye-bolt, thereby increasing the force possible to spin the bolt. Such a mechanism may be critical to relieving tension upon a system of the disclosure, especially in cases where a payload has expanded during transit/storage, or when initial tension was similarly highly-secured. By pulling the rope, tension through the device is relieved, which may relieve the pinching pressure upon ropes R1, R2 and enable the cams to be opened and the rope R1, R2 may be easily removed. As illustrated therein FIG. 3, rope end R1 may extend through rope receiving bend 139 in the direction of cam 111 when in the open position. As can be appreciated by those having ordinary skill in the art, teeth 112 of cam 111 may preferably be oriented to provide maximal frictional force toward the end of rope end R1, such that pulling the end of rope end R1 away from apparatus 100 may slightly open cam 111, but bind the system once pulling has stopped. A repeating of this process for rope end R2 will complete the system of the disclosure, which includes apparatus 100, rope end R1, and rope end R2.

Figure 4:
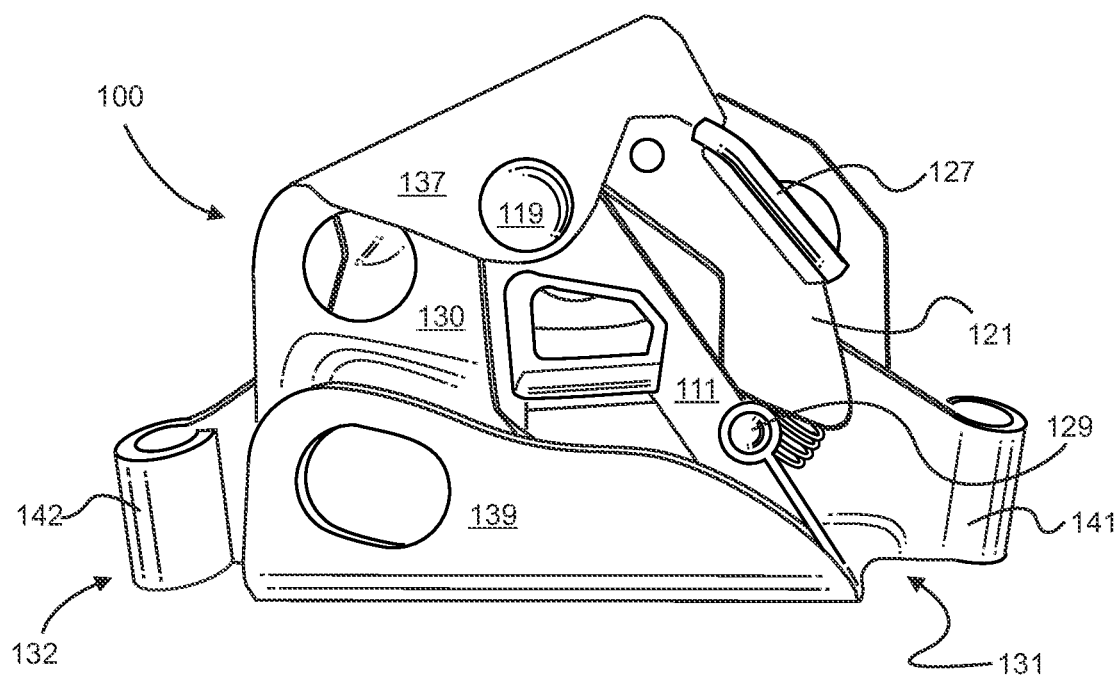
FIG. 4 is an elevation view of the alternate embodiment of the universal tie-down apparatus, the apparatus in the closed position for securing a rope thereon.

Referring now to FIG. 4 specifically, is an elevation view of the alternate embodiment of the universal tie-down apparatus, the apparatus in the closed position for securing a rope thereon. As was the case with the alternate embodiment illustrated in FIGS. 2-3, the same embodiment illustrated in FIG. 4 may include all features of exemplary embodiment of universal tie-down apparatus 100, plus additional features not illustrated therein FIG. 1. Those include channel portion 130 having rope receiving bend 139 opposite cam channel 137, cam 111 attached thereto using cam spring pin 119, cam 111 having teeth 112, lever 125, lever 127, and biasing element 123. The alternate embodiment of apparatus 100 further includes first eye-bolt receiving loop 141 and second eye bolt receiving loop 142. First eye-bolt receiving loop 141 and second eye-bolt receiving loop 142 may each receive an eye-bolt for the further tightening and securing of a rope using the universal tie-down apparatus 100. By first threading the rope through rope receiving bend 139 and the second rope receiving bend opposite rope receiving bend 139 (not pictured) and securing cam 111 upon the rope using, e.g., teeth 112, to hold the rope in place proximate a rope into the aperture formed atop said eye-bolt after first threading said rope through rope receiving bend 139 and closing cam 111 upon the rope. The eye-bolt may be passed upwardly (with the eye atop the loop) through either (or both) of first eye-bolt receiving loop 141 and second eye-bolt receiving loop 142. The rope may be then threaded through the eye, and the bolt may be spun to increase tension upon the system formed using apparatus 100 and rope end R1 and rope end R2. Additional mechanisms, such as another eye-bolt, a rod, a crank, a drill attachment, the like and/or combinations thereof, may be additionally threaded through the eye of the eye-bolt, thereby increasing the force possible to spin the bolt. Such a mechanism may be critical to relieving tension upon a system of the disclosure, especially in cases where a payload has expanded during transit/storage, or when initial tension was similarly highly-secured. By pulling the rope, tension through the device is relieved, which may relieve the pinching pressure upon ropes R1, R2 and enable the cams to be opened and the rope R1, R2 may be easily removed. As illustrated therein FIG. 3, rope end R1 may extend through rope receiving bend 139 in the direction of cam 111 when in the open position. As can be appreciated by those having ordinary skill in the art, teeth 112 of cam 111 may preferably oriented to provide maximal frictional force toward the end of rope end R1, such that pulling the end of rope end R1 away from apparatus 100 may slightly open cam 111, but bind the system once pulling has stopped. A repeating of this process for rope end R2 will complete the system of the disclosure, which includes apparatus 100, rope end R1, and rope end R2. As viewed in the closed position, various features of the apparatus 100 of the disclosure are further illustrated. In a fully closed position, cam 111 may rest upon rope receiving bend 139. Depending on whether cam 111 is flat or grooved, some length of rope may be fed through rope receiving bend 139 without opening, or without fully-opening cam 111. Similarly, opening may be required to initially place rope ends R1, R2 through rope-receiving bend 139, and upon closure, rope ends R1, R2, they may be pinched between cam 111 and rope receiving bend 139 to achieve the result of securing the rope in place. When so secured, cam spring pin 119 and cam 111 in conjunction provide the required downward force for such security and pinching force upon rope ends R1, R2, such that they may be held in place until such time a user desires to open apparatus 100 using, for instance, levers 125, 127 or optional accessory attachments to relieve pressure by increasing tension, as described above.

It is contemplated herein that a wide variety of materials may be utilized to form apparatus 100 of the disclosure. These may preferably include various durable, high-strength to weight materials, such as stainless steel and/or aluminum. Other materials may include other metals, plastics, rubbers, composite materials (e.g., fiberglass and/or carbon fiber), wood, synthetic materials, natural materials, the like and/or combinations thereof. Frictional forces may be achieved using various combinations of these to offer safety or other utilitarian benefits. For example, cam 111 may be coated with a rubberized material to increase its frictional force and reduce the capacity for injury if digits or other anatomical features are placed into rope receiving bend 139 during closure. Those skilled in the art may understand the various tradeoffs and benefits possible by exchanging materials of apparatus 100 of the disclosure, and the disclosure is not so limited to one material or the materials as they may be described herein. Importantly, friction plays an important role in the capabilities of apparatus 100 as herein described and illustrated. Though the inventor has contemplated and disclosed a preferable means to achieve maximal frictional force, the disclosure is not so limited to teeth 112 and may include ridging, grit, scoring, rubberization, the like and/or combinations thereof to achieve the intended goal of supplying adequate grip and friction within apparatus 100 to secure rope R1, R2.

Figure 5:
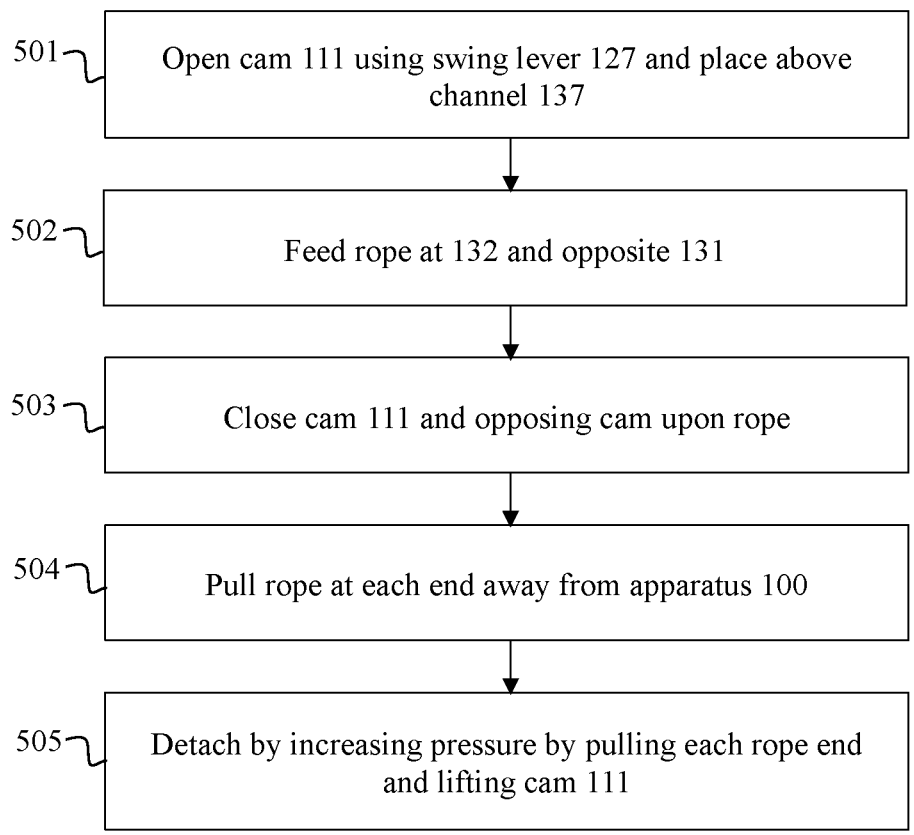
FIG. 5 is a flow chart of the steps of an exemplary method of use of the universal tie-down apparatus.

Referring now to FIG. 5, illustrated therein is a flow chart of the steps of an exemplary method of use of the universal tie-down apparatus 100. Beginning at first method step 501, apparatus 100 of the disclosure is provided and opened to expose rope receiving bend 139. In a potentially preferred embodiment of the disclosed apparatus 100, the open position may be locked by raising levers 125, 127 over and around cam channel 137. Next, at second method step 502, rope is placed into each end of rope receiving bend 139 (132-131) in the direction the open cam 111 is pointed, or with an end pointing in the direction of the open cam 111. Third method step 503 may then require each cam 111 to be closed upon the rope. Then, at fourth method step 504, each of rope end R1 and rope end R2 may be pulled away from apparatus 100. Finally, in order to relieve pressure upon the system, cam 111 and/or the opposing cam 111 may be opened at fifth method step 505. It should be noted that all pressure upon a system formed according to this method may be relieved upon the opening of a single cam 111, but that storage may require opening of the opposing cam 111. Additionally, those features, combinations, and accessories disclosed above may be incorporated into various methods of the disclosure in order to tighten or relieve pressure upon the system formed therein, according to the features and potential options herein described.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A tie-down apparatus for securely joining a first rope end to a second rope end, the tie-down apparatus comprising:
   a first channel assembly and a second channel assembly, each of said channel assemblies having:
   a first bend to form a rope groove;
   a second bend to form a cam channel opposite said first bend;
   said cam channel having a rivet hole; and
   a spring-loaded pin therethrough said rivet hole;
   a first cam rotatably installed thereon said spring-loaded pin of said first channel assembly;
   a second cam rotatably installed thereon said spring-loaded pin of said second channel assembly; and
   an attachment mechanism to secure said first channel assembly parallely opposing said second channel assembly;
   wherein said first cam and said second cam feature a portion having a high-friction surface area proximate an area which is in contact with the first and second rope ends when the tie-down apparatus is in a closed position.

2. The tie-down apparatus of claim 1, wherein a cam length for said first cam and said second cam is greater than a distance between said first bend and said second bend.

3. The tie-down apparatus of claim 2, wherein said first cam and said second cam provide oppositional pinching and frictional forces upon the first rope end and the second rope end.

4. The tie-down apparatus of claim 1, further comprising an at least one tightening accessory loop capable of operable combination with an accessory, said at least one tightening accessory loop is perpendicular the rope groove.

5. The tie-down apparatus of claim 1, further comprising a first cam lever and a second cam lever, wherein said first and second cam levers comprise a perpendicular ridge for rotating the first cam and the second cam.

6. The tie-down apparatus of claim 5, wherein an at least one of said first cam lever and said second cam lever is spring loaded and capable of rotating opposite rotation of the first cam and said second cam to lock said at least one of the first cam lever and said second cam lever above the cam channel to lock the apparatus in an open position.

7. The tie-down apparatus of claim 1, further comprising an at least one aperture of the first channel assembly, and the second channel assembly.

8. The tie-down apparatus of claim 7, wherein said at least one aperture is capable of receiving an at least one accessory, said at least one accessory from a group of accessories, the group of accessories comprising a carabiner, a hook, a web, a net, a mesh, a bungie, a rope, an anchor, a pin, a bolt, and a strap.

9. A method of securing a first rope end to a second rope end, the method comprising:
   providing a tie-down apparatus having:
      a first channel assembly and a second channel assembly each of said channel assemblies having a first bend to form a rope groove, a second bend to form a cam channel opposite said first bend, said cam channel having a rivet hole, and a spring-loaded pin therethrough said rivet hole;
      a first cam rotatably installed thereon said spring-loaded pin of said first channel assembly;
      a second cam rotatably installed thereon said spring-loaded pin of said second channel assembly; and
      an attachment mechanism to secure said first channel assembly parallely opposing said second channel assembly;
   raising said first and second cams into an open position;
   threading the first rope end through said rope groove of said first channel assembly in a direction of which each of said first cam is pointed;
   threading the second rope end through said rope groove of said second channel assembly in an opposing direction; and
   closing said first and second cams upon said first rope end and said second rope end;
   pulling each of said first and second rope ends in a direction away from the tie-down apparatus.

10. The method of claim 9, wherein said first cam and said second cam comprise a rope-contact side which has frictional characteristics against a rope.

11. The method of claim 10, wherein the apparatus further comprises a first cam lever and a second cam lever.

12. The method of claim 11, wherein the first cam lever and the second cam lever form a perpendicular ridge perpendicular a rotational movement of the first cam and the second cam.

13. The method of claim 12, wherein the first cam lever and the second cam lever rotate via said spring-loaded pin to rest above the cam channel and lock the apparatus in an open position.

14. The method of claim 13, wherein the tie-down apparatus further comprises an at least one tightening accessory loop capable of operable combination with an accessory, the at least one tightening accessory loop is perpendicular the rope groove.

15. The method of claim 10, wherein the tie-down apparatus further comprises an at least one aperture, said at least one aperture is capable of receiving an at least one accessory, said at least one accessory from a group of accessories, the group of accessories comprising a carabiner, a hook, a web, a net, a mesh, a bungie, a rope, an anchor, a pin, a bolt, and a strap, further comprising a method step of attaching said at least one accessory to the tie-down apparatus.

\* \* \* \* \*